(No Model.)

G. W. STINEBRING.
INSERTIBLE SAW TOOTH.

No. 285,176. Patented Sept. 18, 1883.

WITNESSES:
Otto Beyer
C. Sedgwick

INVENTOR:
G. W. Stinebring
BY Munn & Co
ATTORNEYS.

UNITED STATES PATENT OFFICE.

GEORGE W. STINEBRING, OF SHREVE, OHIO.

INSERTIBLE SAW-TOOTH.

SPECIFICATION forming part of Letters Patent No. 285,176, dated September 18, 1883.

Application filed May 4, 1883. (No model.)

*To all whom it may concern:*

Be it known that I, GEORGE W. STINEBRING, of Shreve, in the county of Wayne and State of Ohio, have invented certain new and useful Improvements in Saw-Teeth, of which the following is a full, clear, and exact description.

My invention relates to removable saw-teeth; and it consists in making the teeth in the form of a segment of a circle, and concentric on both the front and back edge, in a circular wedge, and in a contrivance of such teeth and the notches of the saw in which they fit, with serrations to hold the teeth in any position to which they may be shifted for setting them to the original gage after they have been shortened by wear and by sharpening, together with an improved gage for setting teeth by, all as hereinafter fully described.

Reference is to be had to the accompanying drawings, forming part of this specification, in which similar letters of reference indicate corresponding parts in all the figures.

Figure 1:
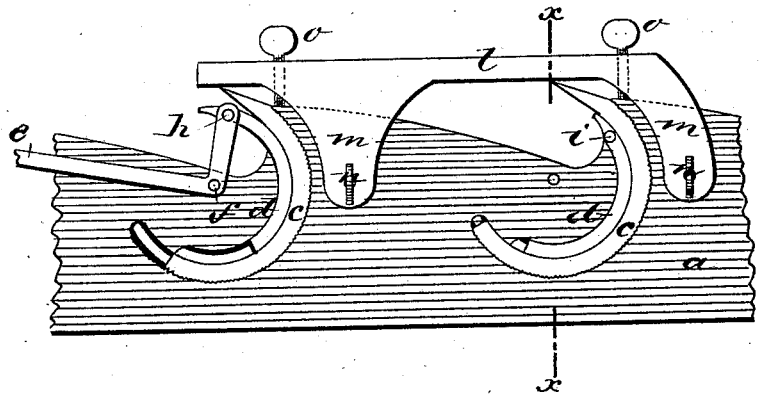
Figure 2:
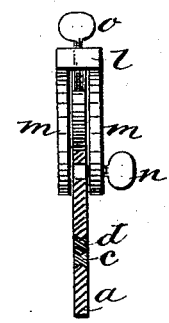
Figure 3:
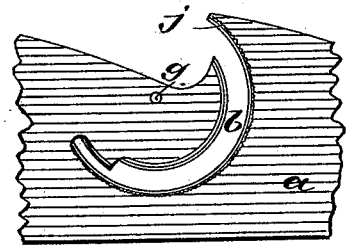
Figure 4:
Figure 5:
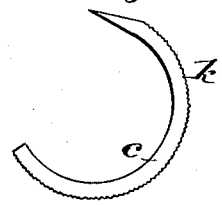
Figure 6:

Figure 1 is a side elevation of a section of a saw-plate with two of my improved teeth, one being entirely secured in its place, and the other being shown shortened and partially secured. Fig. 2 is a cross-sectional elevation on the line $x\,x$, Fig. 1. Fig. 3 is a side elevation of a section of the saw-plate, showing the curved notch for the tooth and the wedge or key by which the tooth is to be secured. Fig. 4 is a side elevation of the wedge which I employ for fastening the teeth. Fig. 5 is a side elevation of one of the teeth, and Fig. 6 is a top or edge view of a section of a saw-plate with a tooth attached as I propose to attach them.

The saw-plate $a$ is to be provided with curved notches $b$ for the circular teeth $c$ and the fastening keys or wedges $d$, the edges of which notches are $\wedge$-shaped for fitting in the corresponding V grooves of the back of the teeth and the front of the keys. The front edges of the teeth are V-grooved, and the back edges of the keys are $\wedge$-shaped, to correspond, for substantially locking the teeth in the notches of the saw, as such teeth are commonly secured, the keys being forced in and out by an elbow-lever, $e$, which is temporarily connected with the saw by a pivot, $f$, inserted in a hole, $g$, which is the axis of the curve of the notch $b$. The short arm of the lever also connects, temporarily, with the key $d$ by a pin, $h$, which enters a hole, $i$, in the upper end of the key.

My improvements in saw-teeth consist of making the teeth $c$ of circular form, with the two edges concentric, and providing a circular wedge, $d$, for securing the tooth in the corresponding-shaped slot or notch $b$ of the saw-plate, and of finely serrating the back wall, $j$, of the notch $b$ in the saw-plate, and also serrating the back edge, $k$, of the teeth, so that as the teeth wear away they may be set out from time to time, and will hold wherever they are set, so that if any one breaks and becomes shorter than the rest it may be set out to the gage of the rest, thus avoiding the cost of new teeth and enabling the saw to be kept round, which is very important for doing good work. For so adjusting the teeth, I employ a gage-bar, $l$, having slotted arms $m$, which straddle the edge of the saw-plate, and have binding-screws $n$ to temporarily secure the gage-bar to the plate, said gage-bar also having two temper-screws, $o$, for regulating the height of the bar from the plate, by which it will be seen that the teeth may be quickly and accurately set to the same gage without regard to their length.

The gage, which has been described to show how the teeth are preferably set, will form the subject-matter of a separate application.

Having thus fully described my invention, I claim as new and desire to secure by Letters Patent—

Removable and adjustable circular saw-teeth $c$, having serrated edges $k$, which teeth are secured in circular grooves of the plate by correspondingly circular-shaped wedges or keys $d$, in combination with a saw-plate having correspondingly-serrated edges $j$ of the grooves for the teeth, substantially as described.

GEORGE W. STINEBRING.

Witnesses:
GEORGE CARL,
ALEX. CARL.